Figure 1:
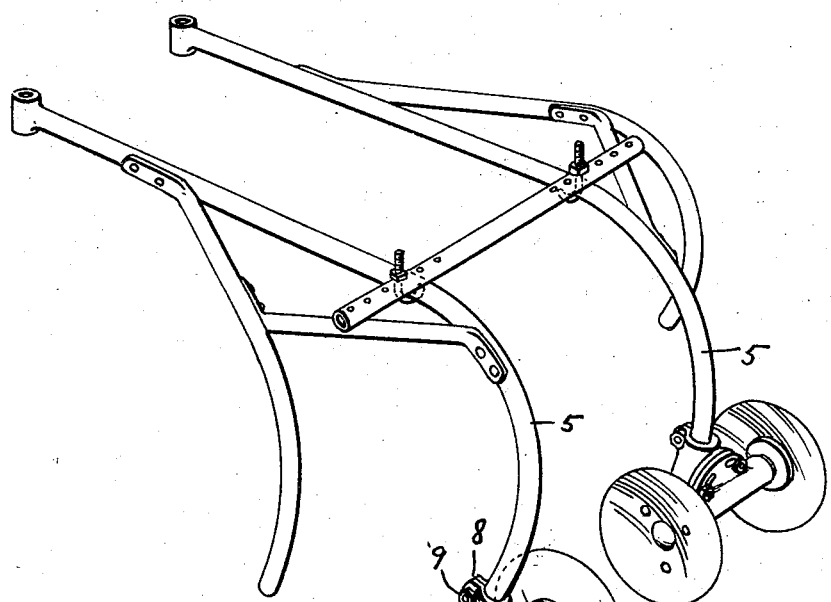

June 3, 1930.  S. C. ENGLISH  1,760,940
CULTIVATOR ATTACHMENT
Filed March 21, 1929  3 Sheets-Sheet 1

Inventor
Stephen C. English

By *Clarence A. O'Brien*
Attorney

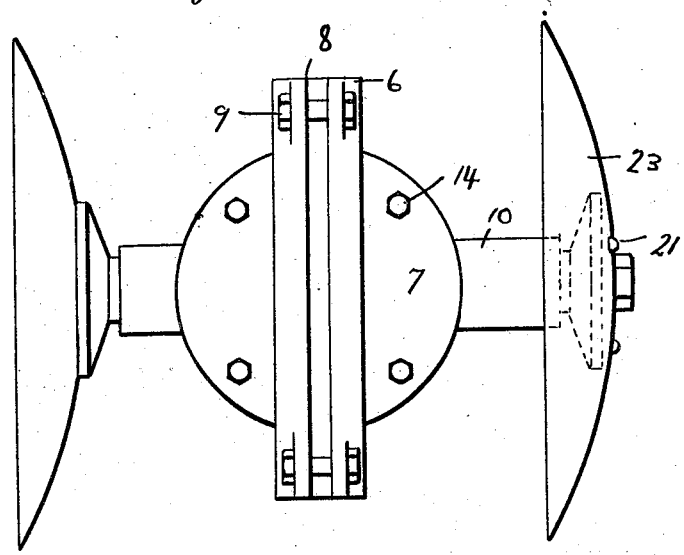
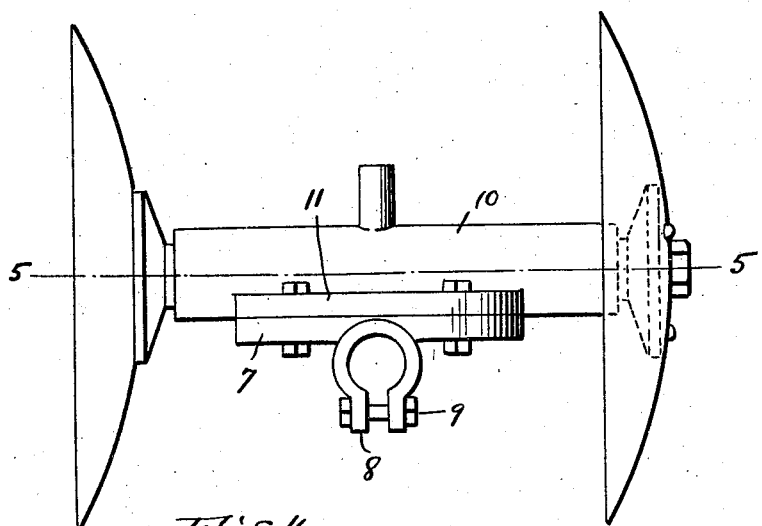

June 3, 1930.  S. C. ENGLISH  1,760,940
CULTIVATOR ATTACHMENT
Filed March 21, 1929  3 Sheets-Sheet 3
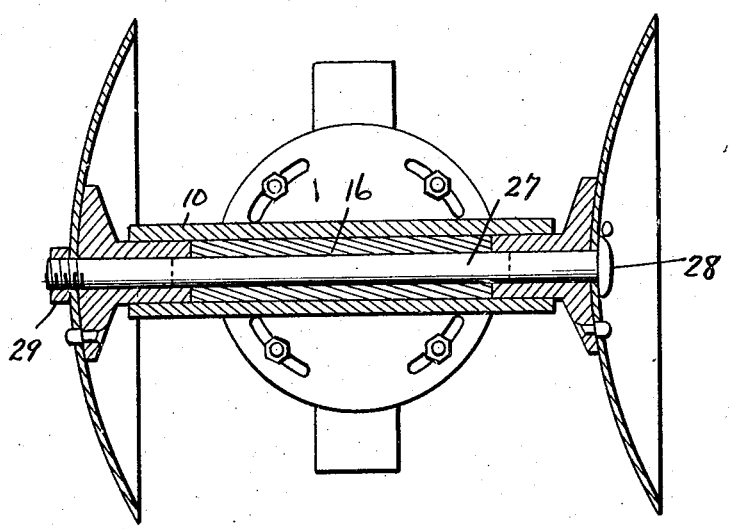
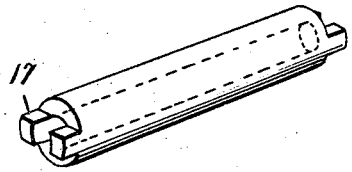
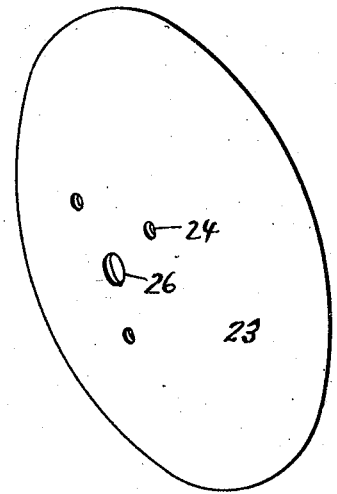
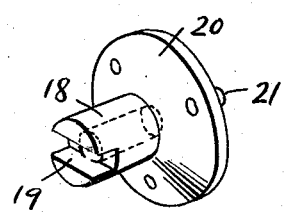
Inventor
Stephen C. English
By Clarence A. O'Brien
Attorney Patented June 3, 1930

1,760,940

UNITED STATES PATENT OFFICE

STEPHEN C. ENGLISH, OF HAMBURG, IOWA

CULTIVATOR ATTACHMENT

Application filed March 21, 1929. Serial No. 348,788.

The present invention relates to an attachment for cultivators and has for its object to provide a comparatively simple and inexpensive device by means of which the ordinary wheeled cultivator may be readily converted into a lister corn cultivator or go-devil; thereby avoiding the using of two machines, one for listing crops and the other for ordinary crops.

More specifically my invention contemplates the construction of an attachment which may be secured to the lower end of a shank by a split sleeve having adjustable means associated therewith for disk cultivating elements.

A still further very important object of the invention resides in the provision of an attachment of this nature which may be easily and quickly installed, strong and durable in construction, easy to assemble and disassemble, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
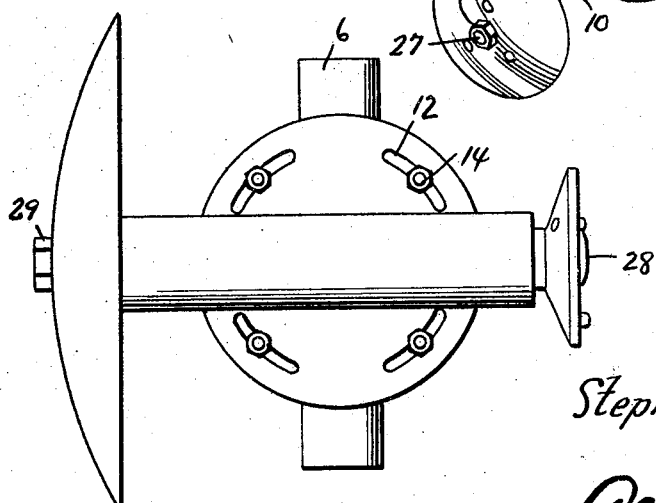

In the drawing:

Figure 1 is a perspective view of a cultivator frame showing my attachments thereon, Figure 2 is a rear elevation of one of the attachments, one of the ends being removed, Figure 3 is a front elevation thereof, Figure 4 is a top plan view thereof, Figure 5 is a sectional view taken substantially on the line 5—5 of Figure 4, Figure 6 is a perspective view of one of the disks, Figure 7 is a perspective view of a bushing, and Figure 8 is a perspective view of a hub.

Referring to the drawing in detail, it will be seen that the numeral 5 denotes a downwardly turned shank on the lower end of which may be placed my attachment. Referring especially to one of my attachments it will be seen that the numeral 6 denotes an elongated split sleeve with a disk 7 formed thereon. The split sleeve is provided with upper and lower pairs of apertured ears 8 through which are extended bolts 9 in order that the sleeve may be tightened circumjacent the lower end of the shank 5. A tubular housing 10 has a disk 11 formed thereon and provided with concentrically disposed slots 12 to receive bolts 14 from the disk 7 so that these disks may be bolted together in different adjusted position that is to vary the angle of the tubular housing 10 in respect to the split sleeve 6.

A bushing 16 is rotatable in the housing 10 and at each end is provided with a pair of lugs 17. A pair of hubs 18 are receivable in the ends of the housing 10 and on the inner end of each hub is a notch 19 to receive the lugs 17 and on the other end is an enlarged head 20 with pins 21 projecting therefrom.

Disks of concavo-convex formation are denoted by the numerals 23 and have openings 24 to receive pins 21 and central openings 25. An axle shaft 27 extends through the openings 26, through the hubs 18 and through the bushing 16.

At one end of the axle shaft is a head 28 and the other end is threaded in a nut 29 to hold tightly the parts assembled together so that the two disks rotate together with the hubs and the bushing. If desired one of the disks may be left off as indicated to advantage in Figure 2.

From the above detailed description it will be seen that I provide a structure in the nature of an attachment which may be readily assembled as to its various parts and may be readily attached to and detached from the shank 5.

It is thought that the construction, utility and advantages of the invention may be now clearly understood by those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an attachment of the class described comprising a split sleeve, a disk formed on the split sleeve, a tubular housing, a disk formed on the tubular housing, pin and slot means for adjustably securing the disks together, a bushing rotatable in the housing, hubs connected to the bushing and roatable in the housing, disks, and means for fastening the disks on the hubs.

2. In an attachment of the class described comprising a split sleeve, a disk formed on the split sleeve, a tubular housing, a disk formed on the tubular housing, pin and slot means for adjustably securing the disks together, a bushing rotatable in the housing, hubs connected to the bushing and rotatable in the housing, disks, and means for fastening the disks on the hubs, said last mentioned means comprising a shaft with a head at one end, said shaft extending through the disk, the hubs and the bushing and a nut threaded on the other end of the shaft.

3. In an attachment of the class described comprising a split sleeve, means for clamping the sleeve on a shank, a disk formed on the split sleeve, a tubular housing, a disk formed on the tubular housing, one of said disks having arcuate slots concentric therein, bolts extending from the other disks through the slot, nuts engaged on the bolts, a bushing rotatable in the tubular housing and having a pair of lugs projecting from each end thereof, a pair of hubs rotatable in the end of the tubular housing and having notches to receive the lugs, the outer ends of the hubs being large, pins projecting outwardly from the enlarged ends, disks having openings to receive the ends, a shaft extending through the centers of the disks, through the hubs and bushing and having a head at one end and a nut at the other end.

In testimony whereof I affix my signature.

STEPHEN C. ENGLISH.